United States Patent [19]

Roberts

[11] Patent Number: 5,207,492

[45] Date of Patent: * May 4, 1993

[54] MIRROR ASSEMBLY

[75] Inventor: John K. Roberts, Sheboygan, Wis.

[73] Assignee: K. W. Muth Company, Inc., Sheboygan, Wis.

[*] Notice: The portion of the term of this patent subsequent to May 7, 2008 has been disclaimed.

[21] Appl. No.: 694,884

[22] Filed: May 2, 1991

Related U.S. Application Data

[63] Continuation-in-part of Ser. No. 482,254, Feb. 20, 1990, Pat. No. 5,014,167.

[51] Int. Cl.$^5$ .............................................. B60Q 1/00
[52] U.S. Cl. ........................................ 362/30; 362/32; 362/61; 362/83.1; 362/135; 362/290; 340/468
[58] Field of Search ................ 362/61, 80, 83.1, 135, 362/296, 290, 26, 32; 340/475, 468

[56] References Cited

U.S. PATENT DOCUMENTS

| | | | |
|---|---|---|---|
| 2,060,401 | 11/1936 | Smith | 177/329 |
| 2,190,123 | 2/1940 | Pace | 177/329 |
| 2,263,382 | 11/1941 | Gotzinger | 177/329 |
| 2,580,014 | 12/1951 | Gazda | 177/329 |
| 2,595,331 | 5/1952 | Calihan | 177/329 |
| 3,266,016 | 9/1966 | Maruyma | 340/382 |
| 3,436,758 | 4/1969 | Kluth | 340/376 |
| 3,543,018 | 11/1970 | Barcys et al. | 240/4.2 |
| 3,665,392 | 5/1972 | Annas | 340/67 |
| 4,040,726 | 9/1977 | Oaca | 350/288 |
| 4,499,451 | 2/1985 | Suzuki et al. | 340/98 |
| 4,516,197 | 5/1985 | Yonkers | 362/342 |
| 4,588,267 | 5/1986 | Pastore | 350/600 |
| 4,626,967 | 12/1986 | Segoshi | 362/61 |
| 4,630,904 | 12/1986 | Pastore | 362/83.1 |
| 4,646,210 | 2/1987 | Skogler et al. | 362/142 |
| 4,733,336 | 3/1988 | Skogler et al. | 362/142 |
| 4,791,534 | 12/1988 | Lindberg | 362/80 |
| 4,793,690 | 12/1988 | Gahan | 350/279 |
| 4,799,768 | 1/1989 | Gahan | 350/279 |
| 4,807,096 | 2/1989 | Skogler et al. | 362/142 |
| 4,882,565 | 11/1989 | Gallmeyer | 340/461 |
| 4,886,960 | 12/1989 | Molyneux et al. | 250/209 |
| 4,917,477 | 4/1990 | Bechtel et al. | 350/357 |
| 5,014,167 | 5/1991 | Roberts | 362/135 |

OTHER PUBLICATIONS

Advertising Brochure 3M Company For a Product called "Light Control Film".
Advertising Brochure For ML21-RN Moder LED's; Mitsubishi Cable Industries.
Advertising Brochure; Gentex Corp.; Gentex Electrochronic Headlamp Control.
Advertising Brochure, Gentex Corporation Automatic Day/Night Glare Control Mirror.
Catalog of OCLI entitled "Stock Filter Catalog 1989".

Primary Examiner—Ira S. Lazarus
Assistant Examiner—L. Heyman
Attorney, Agent, or Firm—Godfrey & Kahn

[57] ABSTRACT

A mirror assembly including an enclosure having an aperture, and defining a cavity, a light source or lamp for emitting light in predetermined wavelengths or an instrument for emitting or receiving light having predetermined characteristics, borne by the enclosure and positioned in the cavity; and a dichroic mirror borne by the enclosure and disposed in substantially occluding relation relative to the aperture, the dichroic mirror reflecting ambient visible light and being substantially transparent to the light emitted by the light source and instrument, or received by the instrument as the case may be.

25 Claims, 9 Drawing Sheets

MIRROR ASSEMBLY

The present application is a continuation-in-part of application Ser. No. 07/482,254 which was filed on Feb. 20, 1990, and which is now U.S. Pat. No. 5,014,167.

1. Field of the Invention

The present invention relates to a mirror assembly which has a wide variety of uses but which has particular utility when mounted on, and electrically coupled with the controls of, an overland vehicle and the like; and more particularly to a combination mirror assembly and signaling apparatus which may operate in one embodiment, as an auxiliary or third brake lamp for overland vehicles such as passenger automobiles, light trucks and the like, or which alternatively may operate, in a second embodiment, as a combination directional signaling lamp or auxiliary brake lamp and rearview mirror assembly including additional signaling assemblies such as clocks; compasses; and warning lights of all types, and receiving devices such as passive optical sensors.

2. Description of the Prior Art

The beneficial effects of employing auxiliary, or so-called "third" brake lamps has been known for some time. For example, studies suggest that overland vehicles equipped with auxiliary brake lamps in particular locations may be less likely to become involved in rear-end collisions. Similar benefits are likely to stem from the use of auxiliary turn lamps. More particularly, federal law mandates that new automobiles and light trucks or utility vehicles include an auxiliary or third brake lamp which is mounted substantially along the longitudinal axis of same and oriented rearwardly of the passenger compartment. In most instances, the auxiliary brake lamps are positioned inside the passenger compartment and displayed in the rear windscreen thereof. These lamps are often referred to as a CHMSL (Center High-Mounted Stop Lamp). Occasionally, however, and due to design considerations, an auxiliary brake lamp may, alternatively, be mounted in a housing which is fixed to the trunk or the like. Such an arrangement is used in the case of convertibles, for example.

While these auxiliary brake lamps generally operate in the manner intended, that is, to provide a visual signal when the brakes are applied, the means by which these auxiliary brake lamps have been mounted on overland vehicles, and more particularly passenger automobiles wherein the auxiliary brake lamps are mounted in the rear windscreen thereof, have generally been considered to detract from the stylish appearance of the most recently manufactured automobiles. Further, and when the auxiliary brake lamp is mounted in a position exterior to the passenger compartment, the auxiliary brake lamp and its associated exterior housing detracts from the surrounding design features of the automobile and which normally include smooth substantially continuous lines which tend to give the vehicle an overall aerodynamic appearance. Further, the housing of this assembly provides an obstruction to the rearward view of the operator, therefore presenting a safety hazard, causes more drag and generates wind noise. In addition, these housings are prone to obstruction during periods of heavy snowfall, are not conspicuous from locations which are adjacent to and rearwardly of the overland vehicle, and are easily obscured by towed vehicles such as boat trailers, camper trailers, and the like.

In addition to the foregoing, a convenient means for mounting an auxiliary brake lamp on light trucks has not been developed. Moreover, and in overland vehicles such as tractor-trailer combinations, an auxiliary brake lamp has not been employed with same. However, operators of such vehicles have long recognized a need for additional brake lamps which could signal an operator of an adjoining vehicle, which may be following closely or passing, that the tractor-trailer is braking, turning or otherwise preparing to change lanes. This would be particularly helpful when the adjoining vehicle passing the tractor-trailer is positioned between the rear of the trailer and the towing tractor, respectively, and in an area which could be out of the view of the tractor-trailer operator as he employs his exterior side view mirrors to look rearwardly.

The manufacturers of overland vehicles have approached the problems related to the function and appearance of auxiliary brake lamp assemblies by designing brake lamps having lower relative profiles and by making other automobile body design changes wherein the auxiliary brake lamp is not as visibly apparent when one views the automobile. However, such design modifications have not been completely satisfactory with respect to aesthetic, and other design considerations, as well as with regards to the intended operation of these same devices. More particularly, these devices, in order to be effective, must be conspicuous. This, of course, is contrary to the desire of automobile designers who wish to produce automobiles which have a low-profile and an aerodynamic appearance. Moreover, and with respect to the earlier identified problems related to light trucks, and tractor-trailer combinations, it should be understood that, with respect to light trucks, loads placed in the beds thereof could conceivably obscure such auxiliary brake assemblies if they were mounted in a fashion similar to that used for passenger vehicles. Moreover, commonly employed equipment, such as camper shells and roll bars also tend to obscure such center mounted brake lamps.

Furthermore, additional problems analogous to the mounting of the auxiliary stop lamps exist with respect to various interior warning lights and displays. For example, designers of the interior portions of automobiles have endeavored, through the years, to create stylized, low-profile, and streamlined consoles, and various instrument clusters and accessories for use by the operator, and passengers, of various overland vehicles while simultaneously presenting or placing critical information in a conspicuous location. Frequently the desire for an aesthetically appealing console arrangements was at odds with the need to present critical information in a conspicuous location. These efforts to design aesthetically appealing consoles or instrument clusters have included, but are not limited to, reducing the size and lowering the profile of the console areas; mounting various warning lights in the console in such a fashion that they cannot be seen except when they are energized or otherwise activated; decentralizing the warning lights to assorted different locations in the vehicle such as to the areas of the doors and roof of the passenger compartment; and using assorted electronic displays, to display information of interest to the occupants of the overland vehicle. The overall design process, however, frequently resulted in instrument clusters being somewhat obscured or otherwise difficult to see, particularly for individuals with impaired vision.

While these assorted interior design changes have operated with varying degrees of success relative to styling considerations, they have often presented difficulties for some operators. For example, some console, or instrument cluster displays, and especially consoles which are entirely digital, may be difficult for some operators to read under particular environmental lighting conditions. Furthermore, some operators of these same vehicles complain that these digital displays are often distracting during the operation of the vehicle due to the constantly changing displays, and the close proximity of the several displays, one to the others. Further, operators of such vehicles may have difficulty quickly locating particular instruments, such as a clock, or vehicle compass, for example, when such information is displayed in close proximity to other instruments in the same instrument cluster. In addition to the inconvenience noted above, these console arrangements may actually inhibit an operator from detecting problems or malfunctions, such as when an operator leaves a flashing directional light activated, perhaps for miles, before detecting its presence, and taking corrective action. Moreover, an operator may, from time-to-time, divert their attention from their driving activities for an unsafe period in an attempt to locate particular information. This, of course, can present numerous hazards to the safe operation of the vehicle.

Other attempts have been made in the prior art to solve the problems noted above by employing various optical means which operate to combine images of various instruments and place these same images within the field of view of the operator. This is accomplished by placing the desired instruments or displays within the rearview mirror housing. In this latter-instance, the mirror characteristics of such devices have typically been compromised in some fashion to allow the instrument image to emanate from the housing and through the mirror surface to the operator's eyes. Such compromises take on a number of different forms. For example, one such compromise includes etching a clear and discrete window in the mirror or otherwise masking off a discrete window prior to the silvering process such that the instrument to be displayed is readily visible when placed in the window. This technique is shown in the patent to Pastore U.S. Pat. No. 4,588,267. While this technique is of some use, as a general matter, mirror performance is substantially compromised with each separate indicia or instrument to be displayed, that is, each area of the mirror which includes a discrete window does not function properly as a mirror. In addition, the aesthetic appearance of these modified mirrors are severely degraded. More particularly, each discrete window appears as a blemish, or at best, a crude discontinuity in the manufacture or design of same.

In addition to the foregoing the prior art illustrates other assemblies which combine indicia, or instruments, within mirrors and which suffer from other, equally debilitating drawbacks. For example, and in the device shown in the patent to Pastore U.S. Pat. No. 4,630,904, mirror discontinuities are eliminated by employing what has been termed a tinted glass plate, or "two-way" mirror. In this particular device the tinted glass plate is not a particularly good reflector and therefore not useful as a rearview mirror. For example, a polished glass reflector such as specified by Pastore typically has an average visible spectrum reflectivity of approximately 4% from each surface, while the minimum useful reflectivity for center rearview mirrors is approximately 70%. Furthermore, the regulations of the Federal Government require that vehicle mirrors must have a visible spectrum reflectivity of 35% or more. Further, assuming that polished tint glass could be modified in some fashion as by using a neutral, half-silvering process to improve reflectivity, the mirror performance would continue to suffer the drawbacks noted above. That is, a tinted, half-silvered mirror continues to be a relatively poor reflector and is an inefficient transmitter. This optical effect will be further described in greater detail hereinafter.

Therefore, it has long been known that it would be desirable to have an improved mirror assembly for an overland vehicle and which is adapted to be mounted on the vehicle and which does not detract from the stylish appearance thereof, and which further does not substantially inhibit the rearward view of the operator or the overall function of the rearview mirror, the mirror assembly mounted within the line of sight of an operator, and providing in a first form, a visual signal similar to that provided heretofore by an auxiliary brake lamp or various warning lamps or instrument clusters, and which further may be rendered operable to provide directional signaling information to vehicles following adjacent thereto or information to the operator, and which further acts as a rearview mirror for the same vehicle, the apparatus being both inexpensive to manufacture and sell and characterized by a compact, aesthetically pleasing appearance.

SUMMARY OF THE INVENTION

Therefore it is an object of the present invention to provide an improved mirror assembly.

Another object of the present invention is to provide a mirror assembly which may be manufactured and installed as original equipment on overland vehicles or the like, or which may further be manufactured in the manner of a retrofit.

Another object of the present invention is to provide a mirror assembly which may be readily installed or integrated with other mirror technology such as motorized actuators, heater elements and films of various types, including electrochromic dimming films.

Another object of the present invention is to provide a mirror assembly which is readily adaptable to most all models and designs of commercially available overland vehicles.

Another object of the present invention is to provide in one form a mirror assembly which operates as a combination rearview mirror and brake lamp or directional signaling lamp.

Another object of the present invention is to provide in one form a mirror assembly which operates as a combination rearview mirror, brake lamp and/or directional signaling lamp, and which further includes various instruments which display information of interest to the operator of the overland vehicle.

Another object of the present invention is to provide in a first form of the invention a mirror assembly which operates to provide a plurality of visual signals, and wherein at least one of the signals is selectively obstructed or blocked by a baffle assembly thereby causing the selected visual signal to be seen, when energized, only from a position along a transmission path which is outside of the line of sight of an operator.

Another object of the present invention is to provide, in a second form of the invention, a mirror assembly which includes various visual signals which may be seen, when energized, from all locations in the overland vehicle.

Another object of the present invention is to provide, in a third form of the invention, a mirror assembly which includes various visual signals which may be seen, when energized, only from the operator's position in the overland vehicle.

Another object of the present invention is to provide a mirror assembly which houses various instruments, which may become visible to the operator when they are energized, and which may remain invisible to the operator.

Another object of the present invention is to provide a mirror assembly which includes a dichroic mirror which is operable to reflect ambient visible light and which further selectively passes predetermined wavelengths of light.

Another object of the present invention is to provide in one form of the invention a mirror assembly which is operable to enclose various instruments or signaling assemblies in such a fashion whereby they may not be seen by the operator, but which are operable to emit or receive light of predetermined wavelengths and which may be viewed from various vantage points relative to the overland vehicle.

Another object of the present invention is to provide a mirror assembly which is operable to obtain the individual benefits to be derived from related prior art devices while avoiding the detriments individually associated therewith.

Further objects and advantages are to provide improved elements and arrangements thereof in a mirror assembly for the purposes intended, which is dependable, economical, durable and fully effective in accomplishing these intended purposes.

These and other objects and advantages are achieved in a mirror assembly and wherein, in the preferred embodiment, the mirror assembly includes an enclosure having an aperture; a dichroic mirror borne by the enclosure and substantially occluding the aperture and adapted selectively to pass and reflect light in predetermined wavelengths; and means borne by the enclosure for emitting or receiving light in the wavelengths passed or transmitted by the dichroic mirror or which pass through the dichroic mirror from the ambient environment, and wherein the dichroic mirror is both an excellent reflector of ambient visible light and an excellent transmitter of the predetermined wavelengths of light generated by the emitting means, or received by the receiving means.

DESCRIPTION OF THE PREFERRED EMBODIMENT

First Form

Figure 1:
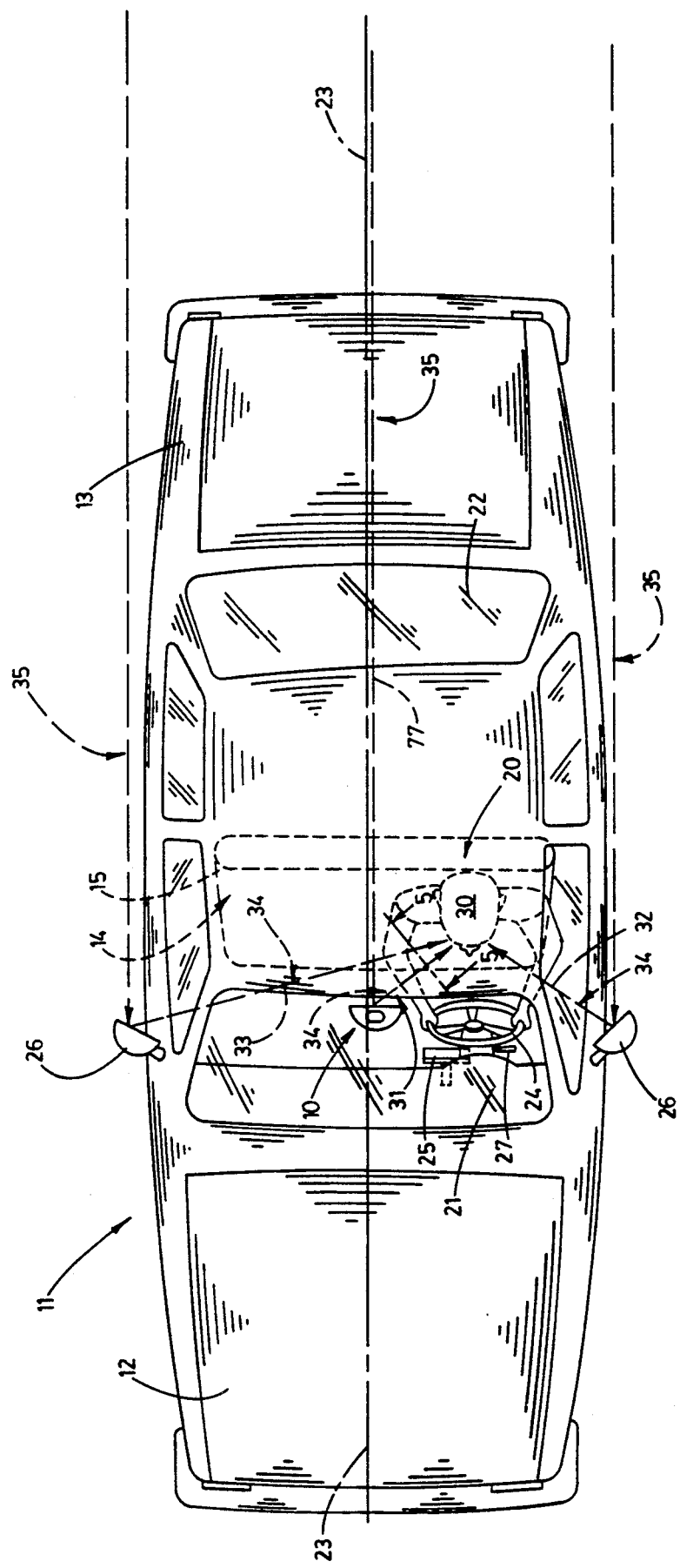
FIG. 1 is a plan view of the three forms of the invention shown in an operative environment of an overland vehicle and wherein some underlying surfaces are illustrated in phantom lines for illustrative convenience.

Referring more particularly to the drawings, the first form of the mirror assembly of the present invention is generally indicated by the numeral 10 in FIG. 1.

For illustrative convenience the mirror assembly shown and described herein is discussed as it would be configured if it were installed on an overland vehicle 11 of conventional design and wherein the mirror assembly may be mounted on the vehicle in place of the rearview mirror which is located in the passenger compartment, and/or in place of the side view mirrors which are mounted on the exterior surface of the vehicle. The mirror assembly 10 of the subject invention will be discussed in greater detail in the paragraphs which follow. The mirror assembly 10 operates as a combination rearview mirror and signaling apparatus and wherein the visual signals it provides include at least two signals. The first signal is capable of being seen from a position rearwardly of the overland vehicle 11 but further cannot be seen by an operator of the same overland vehicle when the operator is located in a position in non-coaxial alignment with the mirror assembly. The second signal can be seen by the operator of the overland vehicle when he is positioned in non-coaxial alignment relative to the mirror assembly, as well as by others who may be viewing the mirror assembly from other vantage points immediately rearwardly of same. These two visual signals will be discussed in greater detail hereinafter.

As best illustrated by reference to FIG. 1, the mirror assembly 10 of the subject invention is mounted on an overland vehicle 11 of conventional design having a front end or forward portion 12, and a rear end or portion 13. The overland vehicle 11 has a passenger compartment 14 which includes a front seat 15 and which further defines an operator's position 20. The overland vehicle 11 also includes front and rear windscreens 21 and 22, respectively, and further has a longitudinal line of reference 23, a steering wheel 24 and a brake pedal 25. A pair of side view mirrors 26 are mounted on opposite sides of the overland vehicle and in a position exterior to the passenger compartment 14. The overland vehicle 11 further has a hand operated directional signaling switch 27 which is electrically coupled with a directional signaling assembly [not shown], and which provides a visual signal which may alert drivers of other vehicles in the immediate vicinity that the overland vehicle 11 is about to change directions, turn, change lanes, etc. The directional signaling assembly normally includes warning lights 28 which are positioned in the passenger compartment and within view of the operator and which flash intermittently, and in substantial unison with, the actuation of the directional signaling assembly. Other visual signaling assemblies may also be positioned in the passenger compartment 14 and which may be viewed by the operator 30 from time-to-time. Examples of such signaling assemblies, or instruments, include a clock 28A, a compass 28B, and assorted warning lights such as that shown at 28C. Other instruments may include radar warning indicator, radio or frequency dials, and luminous alphanumeric, digital or graphic indicia produced by vacuum fluorescent or LED displays. Further, other instruments may include passive instruments such as optical sensors or other control mechanisms not shown. This is best illustrated by reference to FIG. 5. With the exception of the passive instruments, noted above, each of the instruments are operable to produce light whose spectra substantially coincides with a predetermined spectral band which is not greater than 150 nanometers in width. The significance of this feature will be discussed in greater detail below. The term "instruments" as used hereinafter shall therefore include any and all devices or assemblies which individually operate to emit and/or receive electromagnetic radiation forming light which may be visible or invisible to the human eye.

Figure 2:
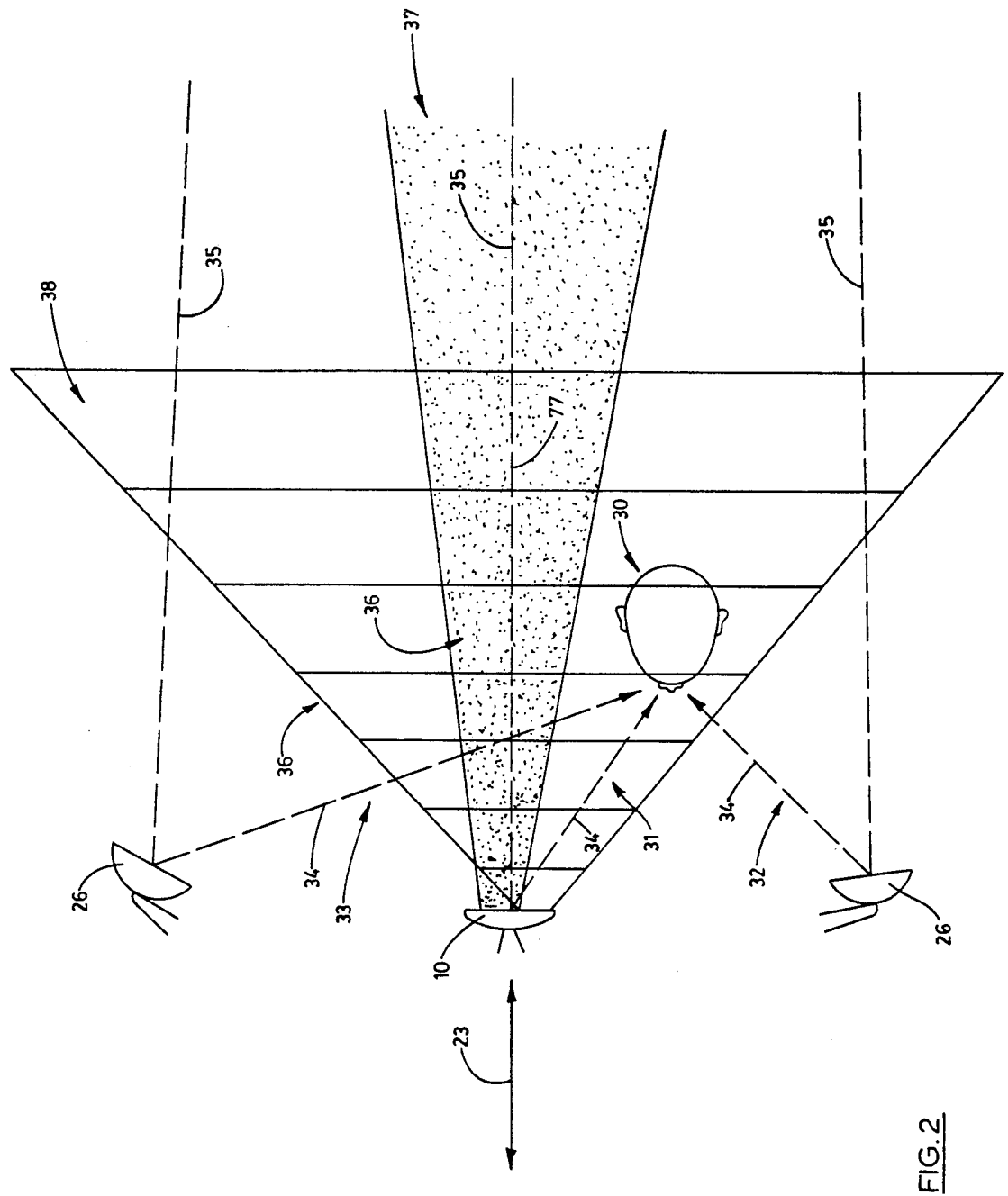
FIG. 2 is a schematic plan view of the first form of the invention shown in an operative environment, and wherein the surrounding supporting surfaces are removed for illustrative convenience.
Figure 3:
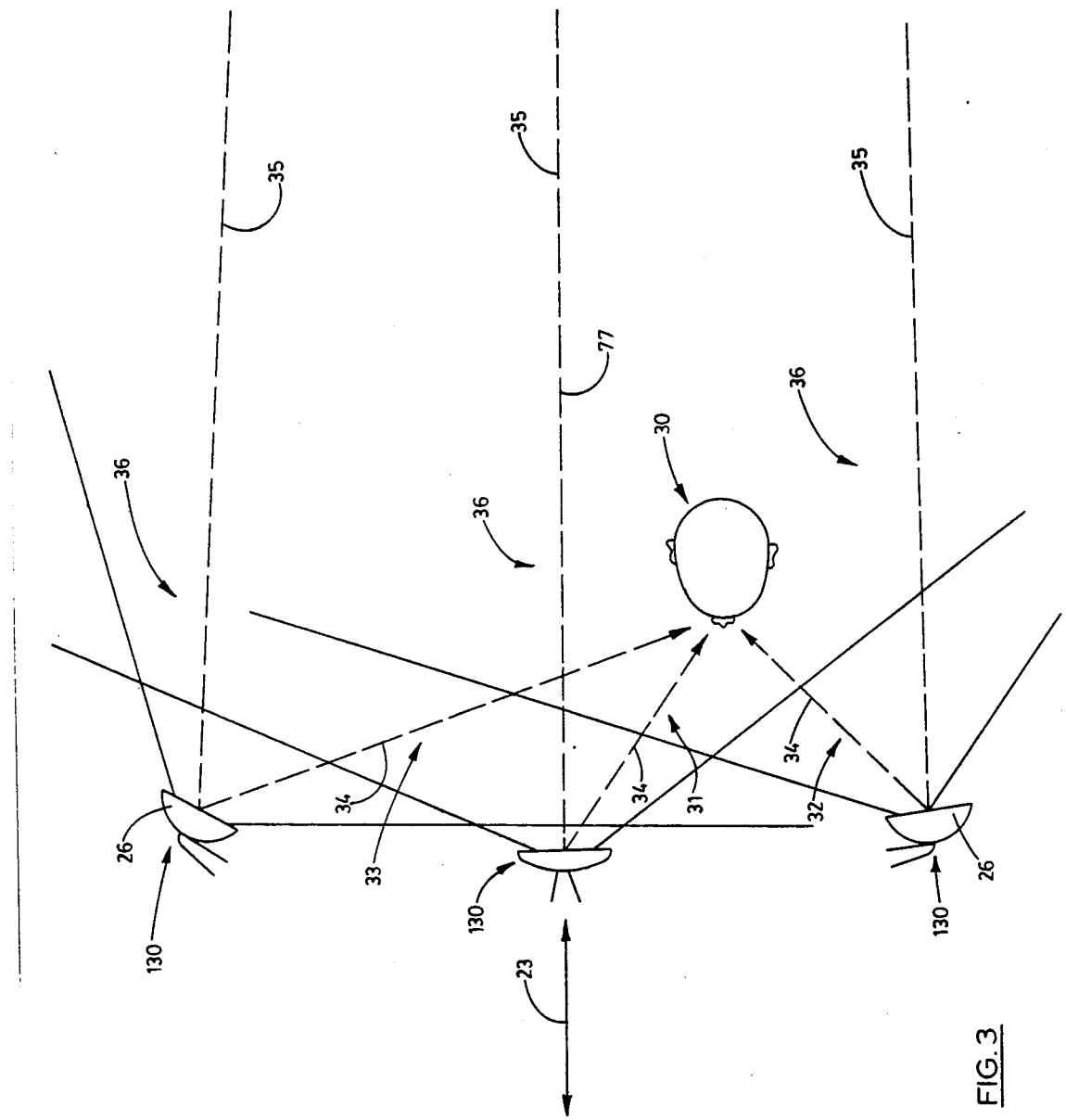
FIG. 3 is a schematic plan view of the second form of the invention shown in an operative environment, and wherein the surrounding surfaces are removed for illustrative convenience.

As best understood by a comparison of FIGS. 1 and 2, an operator 30 when positioned in the operator's position 20 has a field of view which extends approximately 180° from the operators position toward the forward portion 12 of the vehicle. Further, and by using the pair of side view mirrors 26, or the mirror assembly 10 which has been substituted in place of each of the side view mirrors 26, the operator may, by looking along predetermined lines of sight, view areas beyond his normal field of view, and rearwardly of the operators position 20. In particular, and as best illustrated by reference to FIG. 2, the operator 30 has a first line of sight 31, which extends from the operator 30, to the mirror assembly 10 and which permits the operator to view rearwardly of the vehicle 11 and substantially along the longitudinal line of reference 23. The operator 30 further has a second line of sight 32 which extends from the operator to the left or operator's side view mirror 26 of the vehicle 11 and rearwardly thereof and which permits the operator 30 to view rearwardly of the overland vehicle along a line of sight which is somewhat generally parallel to the longitudinal line of reference 23. Furthermore, the operator has a third line of sight 33 which extends from the operators position 20 to the passengers side view mirror 26 and rearwardly thereof. It similarly permits the operator to view along a line of sight which is generally parallel to the longitudinal line of reference 23. Each of the respective lines of sight 31, 32 and 33 have a first component 34 which extends from the operator to the respective mirror; and a second component 35 which extends rearwardly of the vehicle. Further, the mirror assembly 10 has a pair of illumination zones 36, which are positioned in the vicinity of the second component of the line of sight 35. This relationship is best seen by reference to FIG. 3. The mirror assembly 10 produces a first illumination zone 37 which is outside the view of the operator 30 when the operator is positioned rearwardly of and in substantially non-coaxial alignment relative to the mirror assembly 10 and in the operators position. Further, the mirror assembly 10 produces a second illumination zone 38 which may be viewed by the operator 30 when he/she is positioned in the operators position 20, or by passengers (not shown) who may be seated in various locations in passenger compartment 14.

Figure 5:
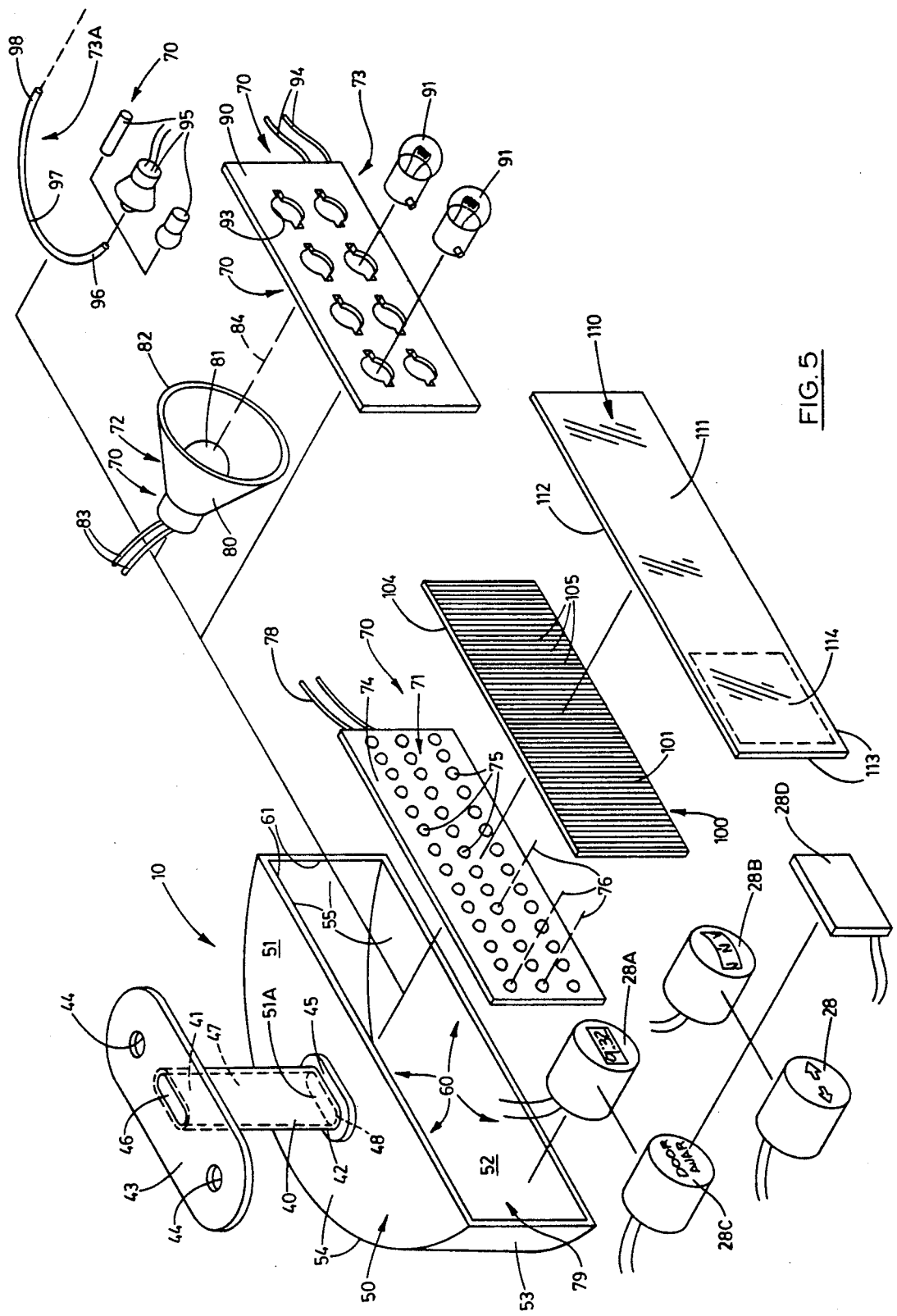
FIG. 5 is a perspective, exploded, side elevation view of the first form of the subject invention taken from a position along line 5—5 of FIG. 1.

The mirror assembly 10, and which is best illustrated by reference to FIG. 5, includes a support member 40 having first and second ends 41 and 42 respectively, and wherein the first end 41 is fixed to a mounting bracket 43 which includes a pair of apertures 44, The apertures 44 receive suitable fasteners such as screws or the like. In addition, the second end 42 is fixed to a swivel connector 45 in a manner which is well understood in the art. The mounting bracket has a substantially centrally disposed aperture 46 which is mounted in registry with a passageway 47 which is formed substantially centrally of the support member 40. An aperture 48 is formed in the swivel connector 46 and disposed in registry with the passageway 47. The swivel connector 45 is fixed to a housing or enclosure 50 and thereby permits the enclosure to be rotated into various positions relative to the operator's position 20 thereby positioning an accompanying mirror in selected positions to provide a field of view rearwardly of the overland vehicle 11 appropriate for the operator 30. The mirror will be discussed in greater detail hereinafter. The housing or enclosure 50 has a top wall 51 which has formed therein an aperture 51A which is disposed in substantial registry with the aperture 48, a bottom wall 52, and a side wall 53 which joins the top and bottom walls together. As shown in FIG. 2, the sidewall 53 is narrowly rectangular and arcuately shaped, however, it should be understood that other enclosure shapes will work with equal success and the final enclosure shape will be largely determined based upon aesthetic, aerodynamic or acoustical considerations. The individual wall members 51, 52 and 53, respectively, have exterior, or outside surfaces 54 and opposite, interior, or inside surfaces 55 which define a cavity 60 of predetermined dimensions. Further, the individual walls, in combination, define an aperture 61 which permits access to the cavity 60. A number of assemblies which are not shown, may be made integral with or mounted in the enclosure these include motors and related actuator assemblies, and heaters, for example, which are operable to act upon a mirror in well understood ways. The mirror will be discussed in greater detail hereinafter.

As best illustrated by reference to FIG. 5 a lighting means and which is illustrated as a light source which is generally indicated by the numeral 70, is borne by the housing or enclosure 50 and mounted in a predetermined location in the cavity 60 for purposes of emitting artificial light of predetermined wavelengths. For purposes of this invention "light source" shall mean any emitter which may produce visible and/or invisible light. In the preferred embodiment, four alternative light sources are shown and which may be used with equal success. However, the invention is not limited to the four light sources discussed herein but may include other artificial light sources which have the characteristics which will be discussed in greater detail hereinafter. It should be understood that notwithstanding the light source 70 which is selected, the light source must be operable to produce wavelengths of light which are substantially "matched", that is, having wavelengths which are substantially similar to the peak wavelength transmittance characteristics of an associated dichroic mirror and which is mounted on the enclosure 50 and disposed in substantially occluding relation relative to the aperture 61. For purposes of this invention the terms "transmit" or "transmittance" shall mean the passage of electromagnetic radiation through an associated dichroic mirror in any direction, that is, both into, and out from, the enclosure 50. Further, the term "pass or passage" shall also describe this same phenomenon. Furthermore, and in the event that the light emitted by the selected light source includes a broad spectral band, then, in that case, filters (not shown) may be employed to condition, or modify the emitted light thereby narrowing the spectral band of emitted light to the predetermined parameters noted above. The characteristics of the dichroic mirror will be discussed in greater detail hereinafter. In the present form of the invention, however, the individual light sources are operable to produce artificial light having wavelengths which include the 600 through 700 nanometer band and which manifests itself by producing the color red. The invention, however, is not limited to the peak wavelengths recited herein, but may further be used with any number of wavelength combinations such that any visual spectrum colors can be seen or any invisible spectral bands may be emitted. Further, it has been found that the preponderance of visible light emitted by the light source should reside in a band not greater than 150 nanometers wide. As earlier discussed filters (not shown) may be successfully employed to narrow the band of emitted light to achieve these parameters. Moreover, the present invention could include more than one lighting source, each of which produces individually discrete spectral bands of light. In this situation, however, a dichroic mirror would be employed which would include discrete areas whose transmission characteristics were individually "matched" to the light sources immediately adjacent thereto. The individual light sources include first, second, third and fourth forms, 71, 72, 73, and 73A respectively.

The first form 71 of the light source 70 includes a bank of LEDs [light emitting diodes]; the second form 72 of the light source 70 includes a single lamp having a light bulb and suitable reflector or similar assembly; the third form 73 includes a lamp support plate which receives a plurality of automotive light bulbs 91; and the fourth form includes a remote light source or light engine and an optical fiber, or light pipe 73A which terminates within the mirror housing. As should be understood, the term "lamp" as used in this invention shall mean any device which emits light which is visible to the human eye. The particulars of the individual light source forms will now be discussed in greater detail. The first form 71 of the light source 70 includes a modular LED array or a bank of LEDs which are individually mounted on a support plate 74 and which produce artificial light having wavelengths which include the 600 through 700 nanometer band. As discussed above, LED's may be manufactured which produce other wavelengths or colors, such as amber, green, or infrared, however, and when this event occurs, the dichroic mirror employed with same would include discrete areas whose individual transmission characteristics would be substantially "matched" to the wavelengths of light which are emitted by the LEDs which are immediately adjacent thereto. A commercially available LED which fits these performance characteristics is manufactured by Mitsubishi Cable Industries Ltd. of Tokyo, Japan under the trade designation "MLY2-RN05 through MLY2-RN20". Another commercially available LED includes the HLMP-103 and which is manufactured by Hewlett Packard of San Jose, Calif. The commercially available LEDs, which are noted above, have high efficiency, and are ultra-radiant red LEDs which have a narrow viewing angle and a peak wavelength which falls within the 600 through 700 nanometer band. Each of the respective LEDs have a beam center 76 which is individually oriented in substantially the same direction and which, in the form of the invention shown in FIG. 1, would normally be oriented in a direction wherein the artificial light produced from the individual LEDs would travel along a transmission path 77 which is oriented generally about the longitudinal line of reference 23 and rearwardly of the overland vehicle 11 such that it could be seen by another vehicle traveling in close proximity thereto and within the first illumination zone 37. Suitable electrical leads 78 would electrically connect the bank of LEDs with the braking, or signaling assembly, or other control circuitry of the vehicle, (not shown) as appropriate. The electrical leads would extend through the passageway 47 of the support member 40 to the appropriate signaling assembly or control circuitry, as necessary. As should be understood by a study of FIG. 5, the bank of LED's has a longitudinal or length dimension which is less than the overall length dimension of the enclosure 50. When appropriately positioned in the enclosure 50, a space 79 is created between the inside surface 55 of the sidewall 53 and the left edge of the support plate 74 as that is viewed in FIG. 5. The space 79 will accommodate at least one, but may also receive several of the instruments, 28, 28A, 28B, and 28C, respectively The second form 72 of the light source 70 is best seen by reference to FIG. 5 and may be used in place of the first form of the light source 71 and which was described earlier as a bank of LEDs. With respect to the second form of the light source 72, the second form includes a single bulb or lamp 81 which is mounted in, or made integral with a suitable reflector 82 or similar optical elements. The lamp would be electrically connected by suitable electrical leads 83 to the signaling assemblies of the vehicle such as, for example, the braking system and wherein upon applying pressure to the brake pedal 25 the lamp becomes energized. An appropriate commercial lamp for this purpose is the GE Precise lamp and which is designated commercially as the MR-16. The lamp 80 has a beam center 84 which is similar in function to the beam centers described with respect to the first form of the light 71. In this second form, the light source 72 would be positioned inside the enclosure 50 in such a fashion so as to accommodate the instruments 28-28C as discussed earlier.

As best illustrated by reference to FIG. 5 the third form 73 of the light source 70 includes a lamp support plate 90 which is adapted to support a plurality of replaceable automotive bulbs or lamps 91 such as the model No. 882 automotive bulbs which are commercially available, nationwide. As best seen by reference to the drawings, the lamp support plate has a plurality of apertures 93 which permits the individual replaceable lamps to be electrically coupled to the lamp support plate. The lamp support plate, of course, carries suitable etching on the reverse surface [not shown] and which conducts electric current from appropriate electric leads 94 to the individual lamps. These lamps 91 also produce artificial light having wavelengths with the characteristics discussed earlier. Furthermore it should be understood that Fresnel lenses, reflectors of various designs, or similar assemblies may be used to shape, or otherwise condition the light beam emitted in a predetermined fashion. In a similar fashion, the lamp support plate is positioned inside the enclosure in a predetermined location which creates the space 79 which will accommodate the various instruments which were discussed earlier.

The fourth form of the light source 73A includes a light engine having a HID lamp (high intensity discharge) or incandescent or halogen lamp, LED, laser, fluorescent, neon, or other discharge tube 95 which is individually placed in a predetermined remote location on the overland vehicle 11, relative to the mirror housing 50. Located in light receiving relation relative to the light source 95 is the receiving end 96 of an optical transmission means such as a light conducting or, so-called fiber optic cable or light pipe 97. The fourth form of the invention also includes secondary optic assemblies (not shown) which may be necessary to gather the light from the light source 95 and input or focus it into the receiving end 96 of the light transmitting means. The secondary assemblies which are not shown are well understood in the art. The light transmitting means extends through the passageway 47 of the support member 40 to the housing 50 and terminates at an opposite or transmission end 98. The transmission end 98 is secured within the mirror housing 50 in a predetermined location such that the light transmitted by the fiber optic cable or light pipe emanates into the housing and can interact as appropriate with any secondary optical assemblies (not shown) such as fresnel lenses, reflectors, holograms, diffusers, etc. and thereafter radiate into the illumination zone 37 where it may be viewed.

A baffle assembly, and which is generally indicated by the numeral 100, includes a polycarbonate light control film which permits artificial light generated by the light source 70 to escape from the enclosure 50. The light emitted by the light source 70 travels along the transmission path 77 and rearwardly of the overland vehicle 11 as best illustrated by reference to FIG. 1. The light control film 101, which is manufactured by the 3M Company under the trade designation LCF-P (light control film-polycarbonate), is a thin plastic film enclosing a plurality of closely spaced, black colored microlouvers. The light control film is approximately 0.030 inches [0.75 millimeters] thick, and the microlouvers are spaced approximately 0.005 inches apart (0.127 millimeters). The microlouvers, which will be discussed in greater detail hereinafter, may be a transparent black or an opaque black, and further, the microlouvers may be positioned in various angular positions to provide a viewing angle, which may include angles as narrow as 48°±6° or as wide as 90°±15°. This is shown most clearly by reference to FIG. 7. It should be understood that the baffle assembly permits light emitted by the various light sources to escape within the viewing angle from the enclosure and travel rearwardly of the overland vehicle 11 along the transmission path 77 and within the illumination zone 37. Further, the light control film is operable to inhibit or block the light emitted by the light source 70 from traveling outside the viewing angle and along the first component 34 of the first line of sight 31 and into the view of the operator 30. This is best seen by reference to FIGS. 1 and 2. It should be apparent, therefore, that the operator may continue to use the mirror assembly 10 as a rearview mirror notwithstanding that artificial light is being emitted from same and is capable of being seen from a location rearwardly of the mirror assembly 10. Further, and as best seen in FIG. 5, the light control film is disposed in partially occluding relation relative to the aperture 61 and in substantial alignment relative to the individual light sources employed. The light control film does not extend across or occlude the space 79. In addition to the foregoing and as best illustrated by a study of FIG. 3, light emitted from the various instruments, and which is not effected by the light control film, escapes the enclosure and travels into the second illumination zone 38 where it may be seen by the operator 30 and other passengers (not shown) who may be traveling in the overland vehicle 11, if it is visible light, or it may not be seen by the operator, if it is invisible light. If the instrument employed is a passive receiver of light then, in that event, the light passes through that portion of the dichroic mirror and aperture which are not occluded by the light control film.

The light control film 101 has a forward facing or front surface 102 and a back or rearward facing surface 103. Further, the light control film is defined by a peripheral edge 104. The light control film has a transverse dimension which closely fits the interior dimensions of the cavity as defined by the inside surfaces of the walls 51, and 52, respectively. Further, and as noted above, the light control film has a length or longitudinal dimension which occludes that portion of the cavity 60 which is occupied by the individual light sources 70. This relationship is best seen by reference to FIG. 5. In an alternate form of the invention the light control film could be replaced by one or more baffle assemblies which may include several plates, louvers or blinds which may be oriented in such a fashion so as to permit the signals to emanate into the desired illumination zone while inhibiting their observation from areas where they might be undesirable or could conceivably cause distraction. Furthermore, the housing 50 could be designed or rendered operable for this same purpose in some applications. Moreover, the light control film could be employed in a fashion wherein the light control film extends substantially across the entire enclosure 50 thereby occluding the aperture 60. However, and in this case, the light control film would have discrete sections, or areas (not shown) wherein the microlouvers would be oriented in predetermined directions, that is, one section would be oriented to direct light emitted by the light source rearwardly of the vehicle, and the second section would be oriented in a fashion to direct light into the view of the operator 30 who would be located in the operator's position The mirror assembly 10 includes a semi-transparent mirror 110. In the first form of the invention, the semi-transparent mirror is a dichroic mirror which selectively passes and reflects light having predetermined wavelengths. As earlier discussed, the individual light sources 70, as well as the instruments 28A–C, are each operable to produce artificial light having the wavelengths including the band from 600 to 700 nanometers and which corresponds with the visible spectrum color red. However, it is possible that the individual instruments could produce light in other wavelength combinations. In the first form of the invention, the dichroic mirror 110 is operable to preferentially transmit or pass the selected wavelengths of 600 through 700 nanometers thereby achieving several laudable benefits which will be discussed in greater detail hereinafter. Of course, and should a different visible color or non-visible spectral band be desired, then, in that event, a different dichroic mirror would be selected which would preferentially transmit or pass the wavelengths corresponding with the spectral band selected. Furthermore, and if the mirror assembly includes several instruments which each produce or receive different spectral bands of light, then, in that event, the dichroic mirror would be manufactured in a fashion wherein particular areas of the mirror would predominately pass just the selected band of wavelengths of light emitted or received by the instrument which is disposed most closely adjacent to that particular area. Therefore, the mirror assembly 10 could, for example, operate as an auxiliary brake lamp, but further, the light emitted by the instruments could include the spectral bands yellow, blue, green, infrared, etc. As should be understood, the dichroic mirror is operable to transmit or pass wavelengths which predominately fall within a narrow spectral band which is not greater than 150 nanometers in width. The dichroic mirror 110 has a front or forward facing surface 111, a back or rearwardly facing surface 112, and a peripheral edge 113 which closely fits the cavity 60 of the enclosure 50 thereby substantially occluding the aperture 61. Further, areas 114 may be present, and which operate to pass other spectral bands of light which may be emitted or received by the individual instruments. This dichroic mirror construction essentially inhibits any light leakage from the light source 70 which is mounted internally of the enclosure. Suitable dichroic mirrors are manufactured by Optical Coating Labs of California which is located in Santa Rosa, Calif.

Figure 10:
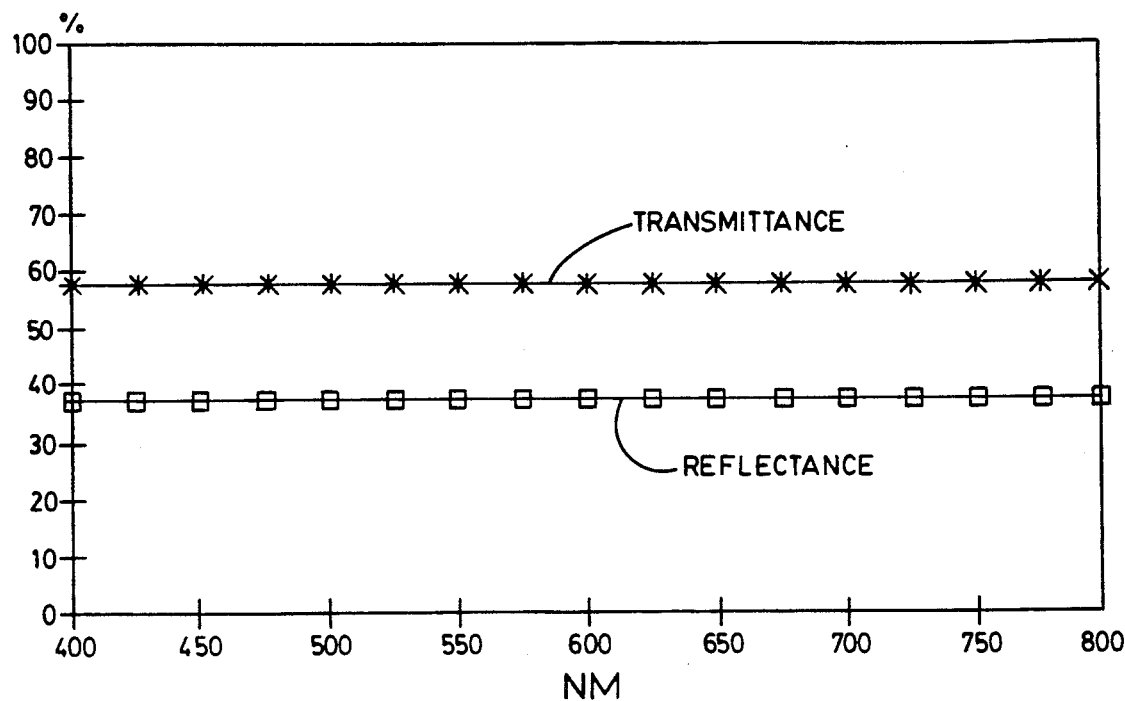
FIG. 10 is a graphic illustration of the reflectance and transmittance of a neutral, semi-transparent mirror, such as a half-silvered mirror, and wherein the neutral, semi-transparent mirror has an average transmittance of approximately 58% and an average visible spectrum reflectance of 37%.
Figure 8:
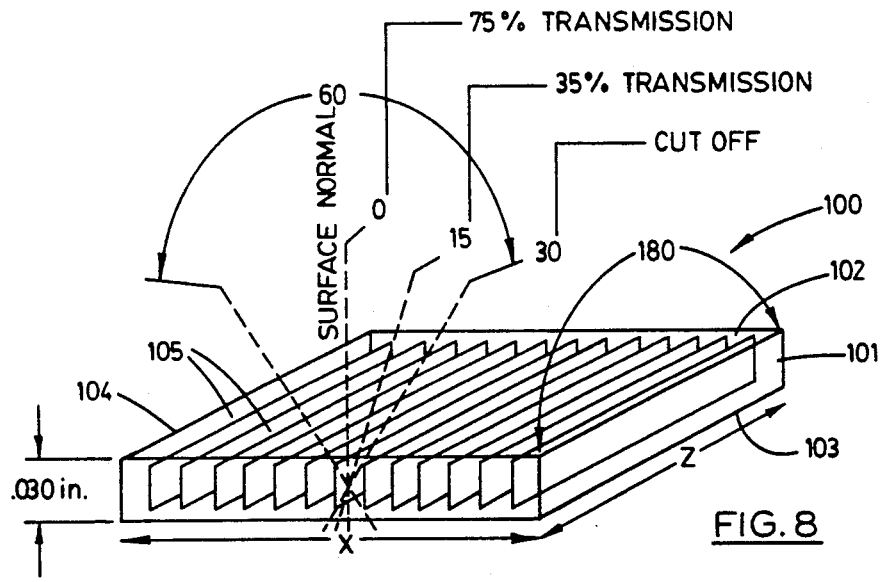
FIG. 8 is a greatly enlarged, side elevation view of the light control film utilized in connection with the first and third forms of the subject invention.
Figure 9:
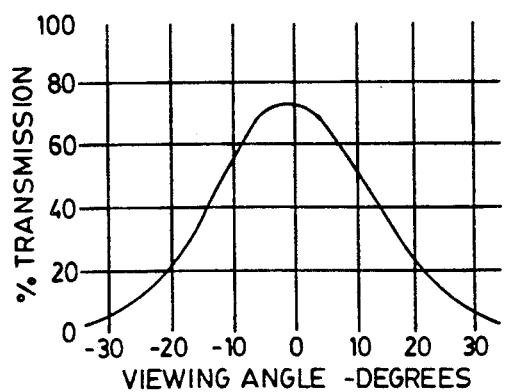
FIG. 9 is a graphic illustration of the viewing angle, in degrees, as it relates to the percentage of transmission of the light control film shown in FIG. 8.
Figure 11:
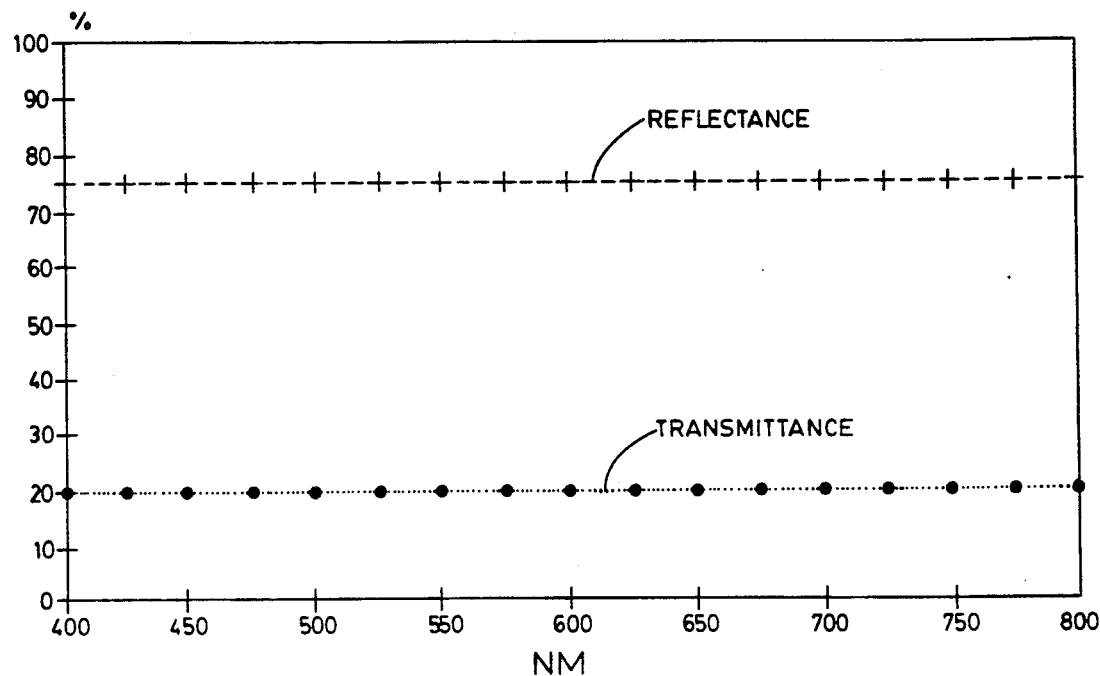
FIG. 11 is a graphic illustration of the reflectance and transmittance of a neutral, semi-transparent mirror such as a half-silvered mirror, and wherein the average visible spectrum reflectance is approximately 75% and the average transmittance of light having wavelengths in the 600 through 700 nanometer band is approximately 20%.
Figure 12:
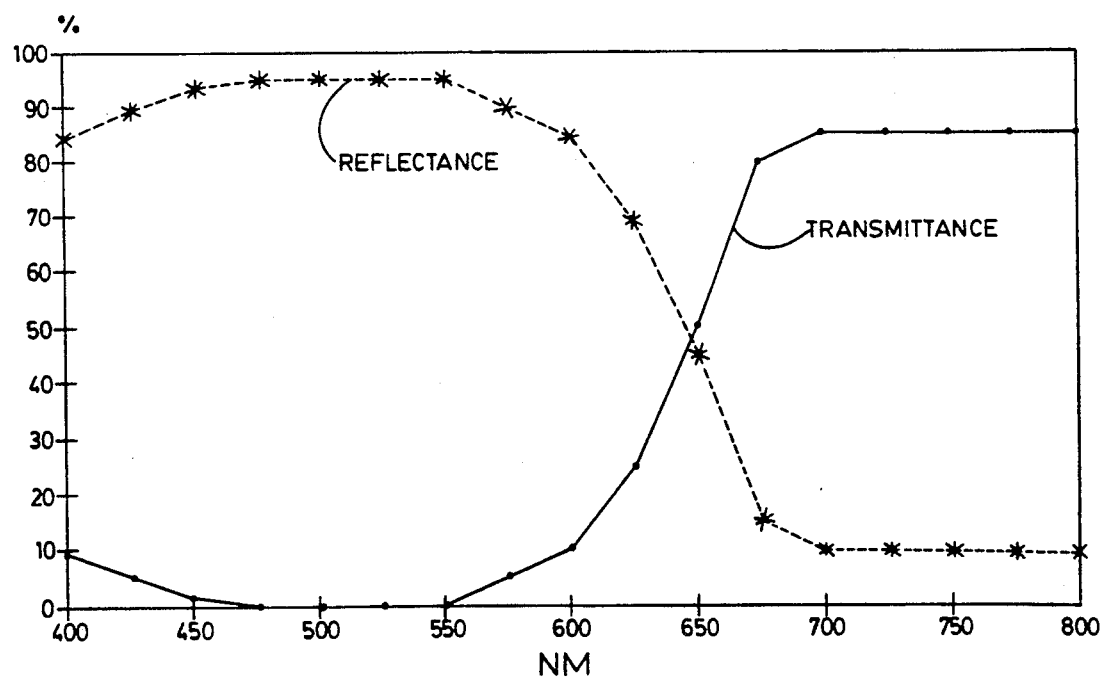
FIG. 12 is a graphic illustration of the reflectance and transmittance of the apparatus of the subject invention and wherein the apparatus includes a dichroic mirror which has an average visible spectrum reflectance of 70%, an average transmittance for light having wavelengths in the 600 through 700 nanometer band of approximately 58%, and greater than 90% transmittance for wavelengths between 700 and 1000 nanometers.

To best understand the advantages achieved by employing a dichroic mirror 110, the inventor has provided in FIGS. 10, 11, and 12 graphic illustrations which demonstrate that a neutral, semi-transparent half-silvered mirror or "two-way" mirror as described in the reference to Pastore will not operate effectively for purposes of the present invention in view of the optical characteristics inherent in their composition. More particularly, FIGS. 10 and 11 show the relationship of transmittance and reflectance as it relates to neutral half-silvered mirrors. In general, as the transmittance increases, reflectance decreases, and vice versa. This relationship is shown by a comparative study of FIGS. 10 and 11. Referring more particularly to FIG. 10, this figure illustrates the characteristics of a neutral, semi-transparent mirror which is capable of passing an average of 58%, of the light having 600 through 700 nanometer wavelengths but is only capable of reflecting an average of 37%, of the visible light across the whole visible spectrum. Approximately 5% of the light is absorbed by the glass. Similarly, and referring more particularly to FIG. 11, when a neutral, transparent mirror, such as a half-silvered mirror is rendered operable to reflect 75% of the visible spectrum, the same mirror passes only 20% of the visible spectrum wavelengths. Similarly, in this case, approximately 5% of wavelength are absorbed. The relationship is clear, that is, as reflectance increases the corresponding ability of a neutral half-silvered mirror to pass light decreases. Therefore, in order to be a good reflector, a neutral half-silvered mirror, of necessity, must be a relatively poor transmitter. If the neutral silver mirror is a poor transmitter, then, in that event, a more powerful lamp must be utilized in order to have the same effect with respect to signaling. Utilizing a more powerful lamp, of course, creates problems in terms of power consumption and the production and accumulation of heat in the enclosure 50 and the related difficulty of the dissipation of same.

In light of the foregoing, the present invention addresses the problem noted above by providing a dichroic mirror 110 which is substantially "matched" with the light source 70, and instruments 28A–C, and more particularly, to the selected wavelengths of light which are emitted or received by the light source and instruments, that is, the dichroic mirror is operable to pass a large percentage of the selected wavelengths of light while simultaneously retaining the ability to be an excellent reflector of ambient visible light. By utilizing such a "matched" dichroic mirror, and as best understood by reference to the example shown in FIG. 17, the dichroic mirror remains an excellent reflector, that is, achieving an average visible spectrum reflectance of 70%, while simultaneously achieving an average transmittance in the 600 through 700 nanometer band of 58%. Furthermore, a peak transmittance of 90% or more can be achieved at wavelengths 660±5 nanometers. Similar results will be achieved for dichroic mirrors which pass green, yellow, or blue light. Thus the apparatus of the subject invention, by utilizing a dichroic mirror which is substantially "matched" to the wavelengths of artificial light transmitted, becomes both an excellent reflector of ambient, visible spectrum light, as well as an excellent transmitter of artificial light emitted by the light source 70 and the various instruments 28A–C. Further, and by utilizing a dichroic mirror 110 which is substantially "matched" to the wavelengths of light selected, lower intensity light sources 70 may be utilized thereby alleviating the problem which is identified above, and which relates to the generation of heat within the enclosure 50. The inventor has further discovered that the dichroic mirror also operates to pass the longer wavelengths of non-visible light such as infrared and which constitutes radiant heat energy thereby further inhibiting the generation and accumulation of heat within the enclosure 50.

Furthermore, this non-visible light, such as infrared which can freely pass through the dichroic mirror surface may represent an encoded or pulsed signal which may be sensed or received by light responsive sensors positioned within the enclosure 50 or may be transmitted from the enclosure and received by light responsive sensors which are remote thereto. Such encoded or pulsed signals could be employed with all manner of data exchange or gathering devices including devices for sensing and locating other overland vehicles in adjoining or adjacent lanes or similar applications.

Second Form

Figure 6:
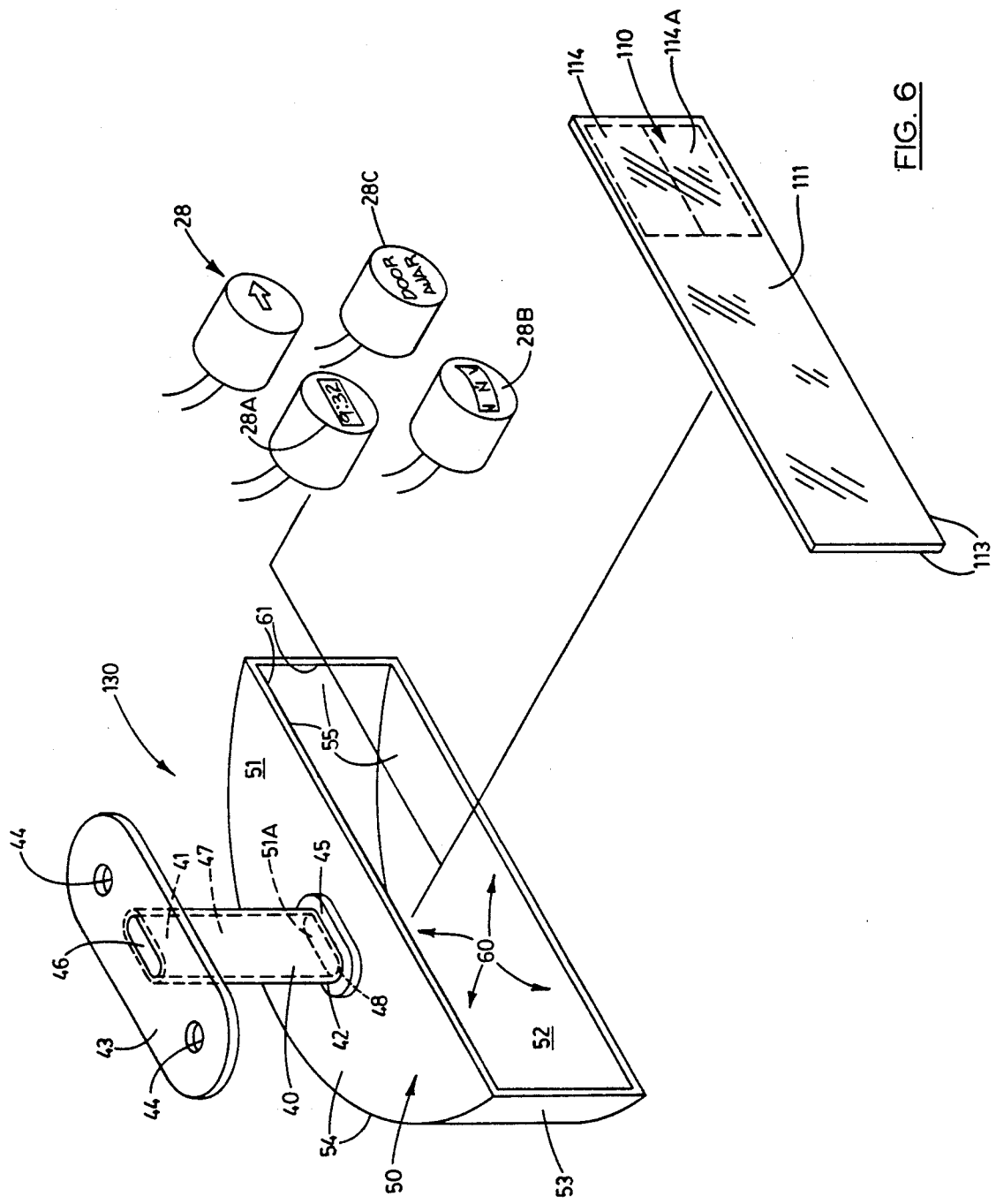
FIG. 6 is a perspective, exploded, side elevation view of the second form of the subject invention taken from a position along line 5—5 of FIG. 1.

The second form of the invention is generally indicated by the numeral 130 in FIG. 6. As should be understood, the second form of the invention includes many of the assemblies of the first form of the invention, that is, a support member 40; mounting bracket 43; and enclosure 50 which is defined by walls 51, 52 and 53. Similarly, the second form of the invention includes a dichroic mirror 110, and the enclosure 50 which defines a cavity 60 receives and otherwise supports and encloses any number of instruments 28A-C, respectively. Further, the instruments 28A-C produce or receive light, when energized, which includes the 600-700 nanometer band or which includes a selected band of light not greater than 150 nanometers in width, and which is transmitted or passed by the matched dichroic mirror. This form of the invention may also include a dichroic mirror which has areas 114, and 114A which are operable to transmit visible and non-visible light of various wavelengths and which are emitted or received by the individual instruments which are positioned immediately adjacent thereto. As should be evident upon a close study of FIG. 6, the second form of the invention is devoid of a baffle assembly 100 or light control film 101 as shown in the first form of the invention. As a consequence, and as best seen by reference to FIG. 3, the light emitted or received from the individual instruments may be seen throughout the passenger compartment 14 of the overland vehicle assuming, of course, that the instruments positioned in the enclosure emit visible light. As was discussed in greater detail in the first form of the invention, any number of different spectral bands of light may be displayed, therefore, the present invention is not limited to the wavelengths discussed above. Furthermore, the second form of the invention can be substituted in place of the side view mirrors 26. Also, and while the instruments displayed in the present drawings include devices which produce visual signaling indicia, any number of different instruments, including visible and non-visible light sensors, may be placed in the cavity 60 to perform any number of specific functions. For example, optical sensors which control the actuation of electrochromic type mirrors may be installed in the cavity 60. In this case, the optical sensor is completely hidden from the view of the operator. In contrast, the prior art mirror assemblies employing the electrochromic technology have employed optical sensors in a manner wherein a discrete window was created in the mirror to accommodate the sensor. The creation of this window, however, had the overall effect of blemishing the mirror and degrading its function, that is, the window created to accommodate the sensor, did not reflect light, and therefore created a blemish which detracted from the overall stylish appearance and utility of the mirror:

Third Form

Figure 4:
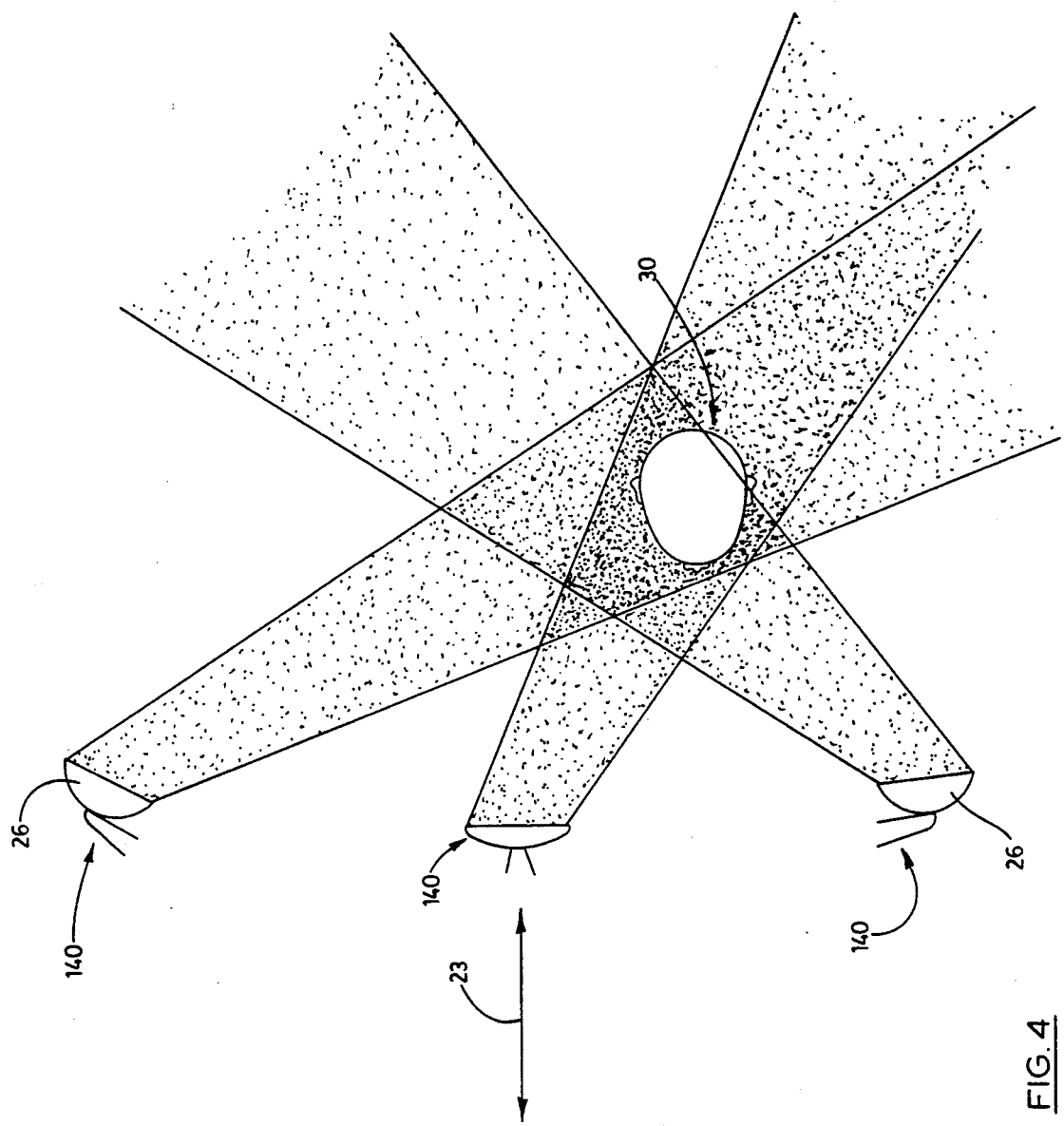
FIG. 4 is a schematic plan view of the third form of the invention shown in an operative environment, and wherein the surrounding surfaces are removed for illustrative convenience.
Figure 7:
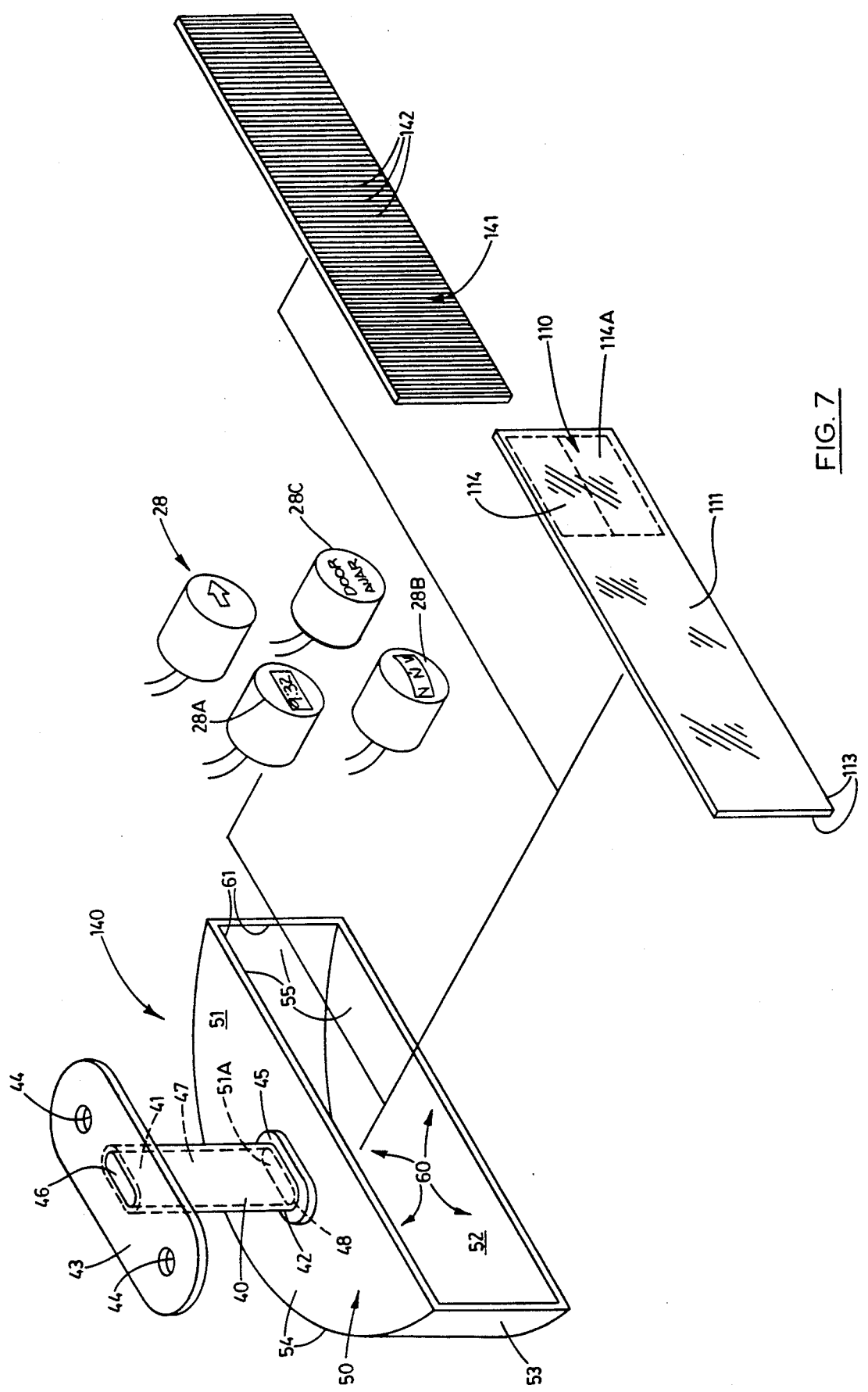
FIG. 7 is a perspective, exploded, side elevation view of the third form of the subject invention taken from a position along line 5—5 of FIG. 1.

The third form of the invention 140 is best understood by a study of FIGS. 4, and 7, respectively. In this form of the invention, the mirror assembly 140 includes many of the features discussed with respect to the first and second forms of the invention, however, in the third form, the mirror assembly includes a light control film 141, which is generally identical in its overall construction to the light control film 101 which was described with respect to the first form 10 of the invention. However, in this form of the invention, the microlouvers 142 are oriented in a fashion wherein the artificial visible light emitted by the various instruments are generally directed along the line-of-sight of the operator 30 and substantially inhibited from traveling into the view of any remaining passengers in the overland vehicle 11. This is best imagined by a study of FIG. 4. As should be understood, the present form of the invention can be mounted internally of the passenger compartment 14 and/or in place of the left and right side view mirrors 26.

In any of the three forms of the invention discussed above it should be understood that the mirror assembly 10, 130 and 140 may be rendered compatible to or made integral with, other mirror technology such as electrochromic coatings, heater films, and motor actuators (not shown). In the case of motor actuators, light sources, and any secondary optics, the light control film and mirror as discussed earlier are constructed and disposed in such a fashion that the actuators do not appreciably interfere with the desired beam of light or signal emanating into, or from, the appropriate illumination zone. In the case of heater elements such as heater tape, or screen printed heater elements which are generally opaque, the heater elements are arranged in a pattern such that they will not interfere with the desired beam of light or signals emanating into, or from, the appropriate illumination zone. This consideration also applies to transparent coating or film-type heater elements similar to those used in conductive vehicle windshields. Finally, and in the case of electrochromic coatings such as those used in anti-glare mirrors it should be understood that an electrochromic coating is chosen which is generally transparent in the spectral band emitted or received by the particular instrument 28 A-C which is mounted in the enclosure 50 even when these particular mirrors are in a fully darkened state. For example, electrochromic solutions such as nickel hydroxide, Ni-(OH)$_2$ have transmission characteristics as high as 50% at 650 nanometers when oxidized (darkened) and transmission characteristics of 80% when reduced.

OPERATION

The operation of the described embodiments of the present invention are believed to be readily apparent and are briefly summarized at this point.

As best illustrated by reference to FIG. 5 the first form of the mirror assembly 10 includes an enclosure 50 having a cavity 60 and defining an aperture 61, and wherein the enclosure is mounted on the overland vehicle 11 in a location which is within the line of sight 31, 32, and/or 33 of an operator 30 who is positioned in the operator's position 20. The mirror assembly 10 of the subject invention further includes a light source 70 which is mounted in the enclosure, and which is positioned in the cavity 60. The light source is electrically coupled with a signaling assembly or other control circuit (not shown), and which in turn is coupled with a directional signaling switch 27, or a switch (not shown), which is used in combination with the brake pedal 25. As should be understood, and upon activation of the signaling assembly, the light source 70 is energized thereby producing light having wavelengths which include the 600 through 700 nanometer band. Further, a number of instruments 28A-C can be positioned in the cavity. Some of these instruments could produce light within the selected wavelength band and some of which could transmit, or receive, light within the invisible portions of the electromagnetic spectrum, as discussed earlier. Additionally, the instruments, as well as the light sources, may produce light having different spectral bands. When this form of the invention is employed the dichroic mirror 110 is manufactured in a fashion wherein particular areas 114 are provided which are substantially "matched" to the spectral band of light emitted. The dichroic mirror 110 is borne by the enclosure 50 and is disposed in substantially occluding relation relative to the aperture 60 and is adapted substantially to reflect an average of 70% of the light within the visible spectrum and further is operable to transmit substantially 58% of the light in the band form 600 to 700 nanometers or any other selected bands which are produced by the light sources, and the instruments, respectively. Further, and as earlier discussed, light may be either transmitted or received, and the light may further include invisible radiation such as infrared light.

A light control film 101, having a plurality of microlouvers 105, is positioned between the dichroic mirror 110 and the light source 70 and is operable to direct or otherwise permit light emitted by the light source 70 to escape from the enclosure 50 and along the transmission path 77 which is generally oriented about the line of reference 23 and rearwardly of the overland vehicle 11 such that it may be seen by the operators of adjacent overland vehicles travelling in close proximity thereto and within the illumination zone 36. Further, the light control film or other baffle assembly are operable to substantially inhibit or block light emitted by the light source 70 from travelling along the first component 34 of the first line of sight 31 and into the operator's vision thereby distracting him/her. As earlier discussed, it is possible that the light control film could include at least two discrete areas. In this form of the invention, one discrete area would direct the light emitted by the light source 70 rearwardly of the vehicle and the other discrete area would direct the light emitted by the instrument into the field of view of the operator 30. This would be accomplished by adjusting the orientation of the individual microlouvers so as to accomplish the desired effect. In addition to the foregoing, it is possible that the light control film could be made integral with the mirror by employing a bonding process, or could be manufactured in a sandwich-like construction in combination with the dichroic mirror. Moreover, visible light emitted by the individual instruments travels into the view of the operator 30 and further can be viewed by other passengers in the vehicle 11, simultaneously, and in combination with the reflected image of the surrounding environment which is adjacent to and disposed rearwardly of the overland vehicle, and the mirror assembly 10.

As earlier discussed, the mirror assembly 10 of the subject invention has been herein described as utilizing a light source and instruments which produce or receive light having wavelengths which include the 600 to 700 nanometer band. However it should be apparent that the subject mirror assembly can be rendered operable to produce different spectral bands of light based upon the particular application or operators needs. For example, spectral bands such as yellow, green, blue and infrared may be selected for use with automobiles as well as other industrial applications. When alternative spectral bands are selected, a light source 70 would be chosen such as an LED or vacuum fluorescent display, which would produce the wavelengths of light desired, predominately within a 150 nanometer wide band, and a dichroic mirror 110 would then be selected which would substantially pass these same wavelengths.

The second form of the invention 130 is best illustrated by reference to FIG. 6 and wherein the enclosure 50 supports various instruments 28A-C in a fashion whereby the visible light emitted by the instruments may be viewed by all occupants of the overland vehicle 11 including the operator 30. As earlier discussed, the light control film 101 and the light sources 70 are absent from the second form of the invention. As should be understood when the various instruments are activated they become visible to the operator of the vehicle who is seated in the operator's position and to other occupants of the vehicles substantially simultaneously and in combination with the reflected image of the environment which is adjacent to and rearwardly of the mirror assembly 10. This assumes of course that the various instruments produce light which is visible to the human eye. In the event the instrument is a light responsive receiver then, in that event, the light would emanate from the ambient environment and pass through the dichroic mirror wherein it would be received by the respective light responsive receiver.

The third form of the invention 140 is similar in some respects to the first form of the invention 10 inasmuch as it includes, instruments, 28A-C, an enclosure 50, a dichroic mirror 100 and a light control film 140. However the third form of the invention is operable, by employing the light control film or other baffle assembly to direct the light generated by the individual instruments along paths of travel and into the view of the operator 30. In this form of the invention the light sources 70 are absent from the invention, only the individual instruments are placed in the enclosure. Similarly, and in this form of the invention light responsive receivers may be employed in a fashion similar to that discussed above with respect to the second form. However, the light control film is operable to direct the light passing through the dichroic mirror to the respective light responsive receiver.

Therefore the mirrors assemblies 10, 130 and 140 of the present invention can be employed in a wide variety of operative environments, can be manufactured and purchased at nominal cost, are effective and reliable in operation, and are compact thereby facilitating installation and maintenance, and further reduces to an absolute minimum the problems associated with related prior art assemblies.

Having described my invention what I claim is new and desire to secure by letters patent is:

1. A mirror assembly comprising:
   an enclosure having an aperture;
   a dichroic mirror borne by the enclosure and substantially occluding the aperture and operable to pass a predetermined narrow spectral band of light, and reflect a broad spectral band of visible light; and
   means borne by the enclosure for emitting light in the predetermined narrow spectral band of light passed by the dichroic mirror, and wherein the dichroic mirror is both an excellent reflector of visible light and an excellent transmitter of the predetermined narrow band of light.

2. A mirror assembly as claimed in claim 1 and wherein the enclosure defines a chamber, and wherein the emitting means includes a light source which is mounted in the chamber, and wherein the enclosure is operable to direct the light through the aperture.

3. A mirror assembly as claimed in claim 2 and wherein the light source includes a lamp.

4. A mirror assembly as claimed in claim 1 and wherein the emitting means includes an instrument.

5. A mirror assembly as claimed in claim 1 and wherein the emitting means includes a lamp and an instrument.

6. A mirror assembly as claimed in claim 5 and wherein an operator utilizing the mirror assembly has a line of sight and the dichroic mirror reflects ambient light forming an image into the line of sight of the operator.

7. A mirror assembly as claimed in claim 4 and wherein an operator utilizing the mirror assembly has a line of sight and the dichroic mirror reflects visible light forming an image into the line of sight of the operator, and wherein a baffle assembly is borne by the enclosure and permits the light emitted by the instrument to travel along a transmission path which is generally oriented along the line of sight of the operator.

8. A mirror assembly as claimed in claim 6 and wherein the lamp is located in a predetermined position in the enclosure, and wherein a baffle assembly is disposed in partially occluding relation relative to the aperture and permits the light emitted by the lamp to travel along a first transmission path which is outside the line of sight of the operator, and wherein the light emitted by the instrument is not affected by the baffle assembly and travels along a second transmission path which is generally oriented along the line of sight of the operator.

9. A mirror assembly as claimed in claim 2 and wherein the dichroic mirror selectively transmits light in a predetermined spectral band which does not exceed 150 nanometers in width, and wherein the light source generates light waves including the wavelengths in the 150 nanometer wide band.

10. A mirror assembly as claimed in claim 5 and wherein the dichroic mirror selectively passes light in a spectral band which does not exceed 150 nanometers in width, and wherein the preponderance of the light emitted by the lamp and the instrument lie within the same 150 nanometer wide band which is passed by the dichroic mirror.

11. A mirror assembly as claimed in claim 5 and wherein the dichroic mirror selectively passes light in discrete spectral bands which do not exceed 150 nanometers in width, and wherein the lamp and the instrument individually emit light lying within discrete 150 nanometer wide spectral bands.

12. A mirror assembly as claimed in claim 11 and wherein the dichroic mirror includes areas which pass the light in the discrete spectral bands, and wherein the areas are individually disposed in substantial alignment with the instrument and light source, respectively.

13. A mirror assembly as claimed in claim 10 and wherein the dichroic mirror reflects an average of substantially 70% of light within the visible spectrum, and passes an average of substantially 58% of the light within the discrete band emitted by the lamp and the instrument, and wherein the lamp and the instrument emit light having wavelengths longer than those in the visible spectrum, and wherein the longer wavelengths constitute radiant heat energy, and wherein the dichroic mirror substantially transmits the longer wavelengths thereby inhibiting the accumulation of heat within the enclosure.

14. A mirror assembly comprising:

an enclosure having an aperture, and defining a cavity;

a light source borne by the enclosure and disposed in the cavity for emitting light in predetermined wavelengths;

an instrument borne by the enclosure and positioned in the cavity for emitting light in predetermined wavelengths;

a baffle assembly borne by the enclosure and positioned in partially occluding relation relative to the aperture and oriented in substantial alignment with the light source; and a dichroic mirror borne by the enclosure and disposed in substantially occluding relation relative to the aperture, the dichroic mirror reflecting ambient visible light, and passing the predetermined wavelengths of light emitted by the lamp and the instrument.

15. A mirror assembly as claimed in claim 14 and wherein the mirror assembly is mounted on an overland vehicle having a longitudinal line of reference, an operators position, and forward and rearward portions, and wherein the enclosure is mounted in a location forward of, and in non-coaxial alignment with, the operators position, and wherein an operator located in the operator's position has a line of sight whereby the operator can, by viewing along the line of sight, see rearwardly of the overland vehicle, and wherein the apparatus has a transmission path which is generally oriented about the longitudinal line of reference, and wherein the baffle assembly is located between the dichroic mirror and the light source and which permits light emitted by the light source to escape the enclosure and travel along the transmission path, and further substantially inhibits light emitted by the light source from traveling along the line of sight and into the view of the operator, and wherein the light emitted by the instrument is not affected by the baffle assembly and escapes the enclosure whereby the operator, by viewing along the line sight, can see the visible light emitted by the instrument while simultaneously viewing rearwardly of the overland vehicle.

16. A mirror assembly as claimed in claim 15 and wherein the baffle assembly includes a light control film having a plurality of substantially equally spaced louvers which are oriented in a predetermined position to permit the light emitted by the light source to escape the enclosure and travel along the transmission path, and wherein the light source produces light in a band which is not greater than 150 nanometers wide, and wherein the dichroic mirror transmits the light emitted by the light source.

17. A mirror assembly as claimed in claim 16 and wherein the dichroic mirror reflects an average of 70% of light within the visible spectrum wavelengths, and transmits an average of 58% of the light in the spectral band emitted by the light source, and wherein the light source emits wavelengths of light which constitute radiant heat energy, and wherein the dichroic mirror substantially passes the wavelengths of light which comprise the radiant heat energy thereby substantially inhibiting the accumulation of heat within the enclosure.

18. A mirror assembly comprising:

an enclosure having an aperture and defining a cavity;

an instrument which emits light in predetermined wavelengths borne by the enclosure and positioned in the cavity;

a baffle assembly borne by the enclosure and disposed in a predetermined position relative to the instrument to direct the light emitted by the instrument along a predetermined transmission path; and a dichroic mirror borne by the enclosure and disposed in occluding relation relative to the aperture, the dichroic mirror reflecting ambient visible light, and passing the predetermined wavelengths of light emitted by the instrument.

19. A mirror assembly for an overland vehicle which has a longitudinal line of reference, and forward and rearward portions, and wherein an operator utilizing the mirror assembly has a line of sight, the mirror assembly comprising:

an enclosure having a cavity and defining an aperture, the enclosure mounted on the overland vehicle and within the line of sight of the operator;

a light source and an instrument each mounted on the enclosure and positioned in the cavity, the light source and the instrument each emitting light having wavelengths which fall within a predetermined spectral band;

a dichroic mirror mounted on the enclosure and disposed in substantially occluding relation relative to the aperture and substantially reflecting an average of 70% of the light having visible spectrum wavelengths, and passing an average of substantially 58% of the light having wavelengths which fall within the predetermined spectral band; and a light control film having a plurality of louvers and which is borne by the enclosure, the light control film permitting the light emitted by the light source to escape the enclosure and travel along a first transmission path rearwardly of the vehicle, and wherein the louvers are operable to substantially block light emitted by the light source from traveling along the line of sight and into the operator's view, and wherein the light emitted by the instrument escapes the enclosure and travels along a second transmission path which is within the line of sight of the operator.

20. A mirror assembly as claimed in claim 19 and wherein the light source and the instrument each emit light within a spectral band which is not greater than 150 nanometers in width.

21. A mirror assembly as claimed in claim 19 and wherein the light source and the instrument each emit light within discrete spectral bands which are not greater than 150 nanometers in width.

22. A mirror assembly as claimed in claim 21 and wherein the dichroic mirror includes areas which are each operable to pass the respective bands of light emitted by the light source and the instrument, respectively.

23. A mirror assembly as claimed in claim 19 and wherein the light control film is positioned in partially occluding relation relative to the aperture and in substantial alignment relative to the light source.

24. A mirror assembly as claimed in claim 19 and wherein the light control film substantially occludes the aperture and has individually discrete portions, and wherein the individually discrete portions are operable to pass the light emitted by the light source and the instrument along their respective transmission paths.

25. A mirror assembly for reflecting light forming a perceivable image into the line of sight of an observer and for emitting electromagnetic radiation which forms various signals comprising:

an enclosure defining an aperture;

a dichroic mirror borne by the enclosure and positioned in substantially occluding relation relative to the aperture, the dichroic mirror reflecting a broad band of electromagnetic radiation within the visible light spectrum while simultaneously permitting a predetermined narrow band of electromagnetic radiation to pass therethrough; and an assembly borne by the enclosure and operable to emit signals formed of electromagnetic radiation within the narrow band passed by the dichroic mirror.

* * * * *